United States Patent
Cho et al.

(10) Patent No.: US 8,512,580 B2
(45) Date of Patent: *Aug. 20, 2013

(54) METHOD OF FABRICATING THIN LIQUID CRYSTAL DISPLAY DEVICE

(75) Inventors: Gyu Su Cho, Kumi-shi (KR); Sung Guen Park, Taegu-kwangyokshi (KR); Byung Chul Kim, Cheonju-shi (KR)

(73) Assignee: LG Display Co., Ltd., Seoul (KR)

( * ) Notice: Subject to any disclaimer, the term of this patent is extended or adjusted under 35 U.S.C. 154(b) by 226 days.

This patent is subject to a terminal disclaimer.

(21) Appl. No.: 10/246,709

(22) Filed: Sep. 19, 2002

(65) Prior Publication Data

US 2003/0057183 A1   Mar. 27, 2003

(30) Foreign Application Priority Data

Sep. 21, 2001 (KR) .................. 10-2001-0058742
Jul. 12, 2002 (KR) .................. 10-2002-0040778

(51) Int. Cl.
*C30B 33/08* (2006.01)
*C03C 15/02* (2006.01)
*C03C 19/00* (2006.01)

(52) U.S. Cl.
USPC .................. 216/23; 216/38; 216/97

(58) Field of Classification Search
USPC .......... 216/23, 24, 38, 52, 53, 84, 97; 451/41
See application file for complete search history.

(56) References Cited

U.S. PATENT DOCUMENTS

| | | | | |
|---|---|---|---|---|
| 2,180,798 A * | 11/1939 | Collins | ............ | 216/84 |
| 3,310,495 A * | 3/1967 | Masuda et al. | ............ | 216/88 |
| 4,180,723 A * | 12/1979 | Szupillo | ............ | 219/541 |
| 5,087,481 A * | 2/1992 | Chen et al. | ............ | 427/129 |
| 5,096,854 A * | 3/1992 | Saito et al. | ............ | 438/406 |
| 5,584,959 A * | 12/1996 | Kimura et al. | ............ | 156/345.12 |
| 5,679,212 A * | 10/1997 | Kato et al. | ............ | 438/692 |
| 5,766,493 A | 6/1998 | Shin | | |
| 5,835,176 A | 11/1998 | Jeong et al. | | |
| 5,851,411 A * | 12/1998 | An et al. | ............ | 216/23 |
| 5,916,412 A * | 6/1999 | Nakashiba et al. | ...... | 156/345.14 |
| 6,121,144 A * | 9/2000 | Marcyk et al. | ............ | 438/692 |
| 6,197,209 B1 * | 3/2001 | Shin et al. | ............ | 216/84 |
| 6,228,211 B1 * | 5/2001 | Jeong | ............ | 156/345.11 |
| 6,391,137 B1 * | 5/2002 | Matsushima | ............ | 156/250 |
| 6,491,572 B1 * | 12/2002 | Horie et al. | ............ | 451/63 |
| 6,497,238 B1 * | 12/2002 | Knotter | ............ | 134/1.3 |
| 6,544,893 B2 * | 4/2003 | Eto | ............ | 438/693 |
| 6,568,995 B1 * | 5/2003 | Mitani et al. | ............ | 451/36 |
| 6,673,195 B2 * | 1/2004 | Chen et al. | ............ | 156/345.23 |
| 6,675,817 B1 * | 1/2004 | Doh | ............ | 134/56 R |

FOREIGN PATENT DOCUMENTS

| | | |
|---|---|---|
| JP | 02-138459 | 5/1990 |
| JP | 03-022390 | 1/1991 |
| JP | 04-116619 | 4/1992 |
| JP | 05-249422 | 9/1993 |
| JP | 05-249423 | 9/1993 |
| JP | 07-168172 | 7/1995 |
| KR | 10-2000-0021813 | 4/2000 |

* cited by examiner

*Primary Examiner* — Maureen Gramaglia

(74) *Attorney, Agent, or Firm* — McKenna Long & Aldridge, LLP.

(57) ABSTRACT

A method of fabricating a thin liquid crystal display device including a glass substrate having a flat surface. The method includes etching at least one surface of a liquid crystal display, panel, and grinding the surface of the liquid crystal display panel so as to planarize the etched liquid crystal display panel.

4 Claims, 5 Drawing Sheets

METHOD OF FABRICATING THIN LIQUID CRYSTAL DISPLAY DEVICE

This application claims the benefit of the Korean Application No. P2001-58742 filed on Sep. 21, 2001, and the Korean Application No. P2002-40778 filed on Jul. 12, 2002, which are hereby incorporated by reference for all purposes as if fully set forth herein.

BACKGROUND OF THE INVENTION

1. Field of the Invention

The present invention relates to a method of fabricating a thin liquid crystal display device and, more particularly, to a method of fabricating a thin liquid crystal display device having a flat surface.

2. Discussion of the Related Art

Recently, many efforts have been made to study and develop various flat panel displays such as liquid crystal display (LCD) devices, plasma display panels (PDP), electroluminescent displays (ELD), vacuum fluorescent displays (VFD) and the like. LCDs having excellent image quality and low power consumption are most widely used.

A liquid crystal display device includes lower and upper substrates facing each other so as to leave a predetermined interval and a liquid crystal layer formed between the lower and upper substrates. Black matrix and color filter layers are formed on the upper substrate. A plurality of gate and data lines are arranged horizontally and vertically on the lower substrate, respectively, so as to define pixel areas. Pixel electrodes and thin film transistors are formed in the pixel areas.

A method of fabricating the liquid crystal display includes forming a lower substrate having thin film transistors and pixel electrodes thereon; forming an upper substrate having color filter layers; forming a panel by bonding the upper and lower substrates to each other; forming a plurality of unit panels by cutting the panel; injecting liquid crystals inside the panel; and sealing the panel.

A light-weighted and compact-sized liquid crystal display device is required for portable televisions and portable notebook computers, or the like. There are structural and technical limitations for compact sized and light-weighted devices. A glass substrate as a basic component of the liquid crystal display device is the heaviest of the components constituting the liquid display device so there is some possibility in reducing its weight. Hence, many efforts have been made to study decreasing the weight of the glass substrate.

In order to decrease the weight of the glass substrate, the glass substrate should be thinly formed. There are many opportunities to apply physical forces to the glass substrate during the process of fabricating the liquid crystal display device and the substrates undergo many heating and cooling steps. Therefore, if the glass substrate is made thinner, it is more easily broken.

Instead, after a thick glass substrate has been used at the early stage of the fabrication process, the glass substrate is thinned. Namely, devices or color filters and the like are formed on the thick glass substrate so as to prepare an upper or lower substrate. The upper and lower substrates are bonded to each other so as to form a liquid crystal display panel. An outer surface of the liquid crystal display panel is then shaved so as to reduce the thickness of the liquid crystal display device.

Wet etch using an etchant of strong acid is generally used as a method of shaving the outer surface of the liquid crystal display panel. Namely, the glass substrate is dipped in an etchant solution provided in a vessel so that the etchant solution etches the surface of the glass substrate to reduce its thickness.

A process of making a thin liquid crystal display panel according to a related art is explained as follows.

Referring to FIG. 1, an upper glass substrate 5 having color filters formed thereon and a lower glass substrate 1 having thin film transistors formed thereon are bonded to each other so as to provide a liquid crystal display panel 10. The upper and lower glass substrates 5 and 1 have the same thickness, for example about 0.7 mm.

Referring to FIG. 2, the liquid crystal device panel 10 is transferred to an etching unit so that the upper and lower glass substrates 5 and 1 are etched. Through the etch, the liquid crystal display panel 10 constituted with the glass substrates each of which is about 0.7 mm thickness becomes a liquid crystal display panel 10' constituted with thin and light glass substrates each of which has a thickness of about 0.6 mm.

The liquid crystal display panel 10' is transferred to a cleaning unit. In the cleaning unit, impurities attached to a surface of the liquid crystal display panel 10' are removed using deionized water. The liquid crystal display panel is then transferred to a drying unit.

In this case, an etched thickness of the liquid crystal display panel 10 is controlled by adjusting an etching time. Namely, an etching target is set up so that the upper and lower substrates 5 and 1 of which the sum of the thickness is about 1.4 mm becomes about 1.2 mm thick, and the etch time is controlled so as to carry out the process.

In this case, there may be a chance, as shown in FIG. 3, that scratches A exist originally on the upper and lower glass substrates 5 and 1 or the scratches A are formed on the substrates 5 and 1 by an equipment during the fabrication process. If the etching step is carried out under such conditions, the substrates are etched more in the directions of depth and width of the scratches so as to bring about failure of the device.

Namely, since the extent of etching is controlled by time, the glass substrate which is etched longer enhances the depth and width of the scratches A'. Hence, if a size of the scratch becomes greater than a dot size, light passing through the liquid crystal display panel is refracted to an unwanted path so as to generate a transmittance difference. Therefore, a stain occurs on a screen of the liquid crystal display device.

In the progress of the etching step, a state variation of the substrate according to a time variance is explained by referring to FIG. 4 as follows.

FIG. 4 illustrates an etching state of a glass substrate, for example the upper glass substrate 5 in FIG. 2, in accordance with time variances (1), (2), (3) and (4) before etching is carried out and while the etching is carried out. Where $\Delta D_0$ is a depth of a scratch before etching, $\Delta D_1$ to $\Delta D_3$ indicate variations of the depth of the scratch according to an etching process, $\Delta W_1$ to $\Delta W_3$ represent variations of a width of the scratch in the etching process, and $\Delta t$ is a variation of an etching thickness.

Since an energy state of the glass substrate is unstable before the etching (1), an initial reaction rate is too large when the glass substrate 5 is first contacted with the etchant. Hence, the thickness of the glass substrate 5, as shown in (2), becomes smaller so that the etching progresses abruptly in directions of the depth and width of the scratch.

Next, when the etchant continues to react with the substrate so as to make a failure portion of the scratch stable, the glass substrate 5 is etched slowly to the thickness At and the scratch portion is etched isotropically. Namely, when the scratch portion becomes stable, an etching amount of the surface of the glass substrate 5 becomes equal to that of the depth of the scratch portion so that a variation in the depth direction of the scratch becomes 0. In other words, as shown in (2), (3), and (4), $\Delta D_1 \neq \Delta D_2 \neq \Delta D_3 \neq 0$. Yet, the etch variation in the width direction of the scratch portion increases gradually so as to have the condition of $\Delta W_1 << \Delta W_2 << \Delta W_3$.

When the glass substrate is made thin through the above-explained process, a failure size depends on and is proportional to the etching amount. Hence, a stain may occur on a screen of a liquid crystal display device.

The problems caused on the substrate by the scratches during the etching step have been explained. Besides, particles formed on the surface of the substrate may generate an etching rate difference, and the impurities generated during the etching step may form protrusions locally on the surface of the substrate. In these cases, light passing through the substrate is refracted to an unwanted path so as to degrade an image quality.

Namely, in the related art, when lower and upper glass substrates 1 and 5 having thin film transistors and color filters formed thereon, respectively are bonded to each other so as to be etched, as shown in FIG. 5, particles formed on a surface of the lower glass substrate 1 or the upper glass substrate 5 form protrusions 7 locally on the surface of the substrate. Reference numeral '2' is a liquid crystal layer.

In order to overcome such problems, as shown in FIG. 6, another method is proposed in that the rest of the portion of the substrate excluding portions having the protrusions is charged with a specific material 9 so as to planarize a surface of a substrate. But, such a method fails to overcome a refractive index difference between the upper glass substrate 5 and charged material 9 so as to be unable to clear stains on a screen. Moreover, the charged material 9 increases the thickness of the substrate again.

SUMMARY OF THE INVENTION

Accordingly, the present invention is directed to a method of fabricating a thin liquid crystal display device that substantially obviates one or more problems due to limitations and disadvantages of the related art.

An advantage of the present invention is to provide a method of fabricating a thin liquid crystal display device including a glass surface having a flat surface.

Another advantage of the present invention is to provide a method of fabricating a thin liquid crystal display device including a glass substrate having a flat surface and a stain-free image owing to no refractive index difference.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a method of fabricating a thin liquid crystal display device according to the present invention includes etching at least one surface of a liquid crystal display panel; and grinding the surface of the liquid crystal display panel so as to planarize the etched liquid crystal display panel.

Namely, the present invention provides a method of fabricating a liquid crystal display device having no stains on a screen by planarizing a surface of a substrate by etching a substrate of a liquid crystal display device and removing scratches and impurity protrusions, which are formed on the surface of the substrate during the etching, and other scratches that may occur by processing equipments.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Figure 1:
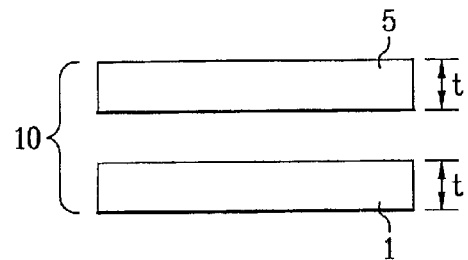
FIG. 1 illustrates a cross-sectional view of a related art liquid crystal display device.
Figure 2:
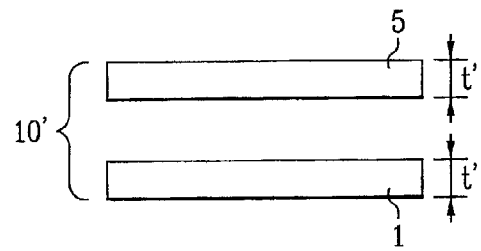
FIG. 2 illustrates a cross-sectional view of a related art liquid crystal display which is made thin by a general etching process.
Figure 3:
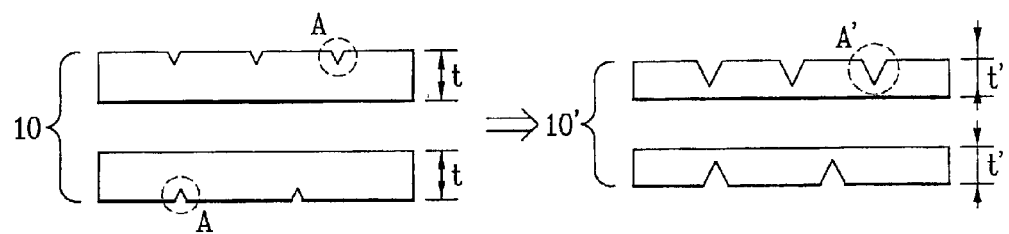
FIG. 3 illustrates a cross-sectional view for explaining problems of a related art thin liquid crystal display device.
Figure 4:
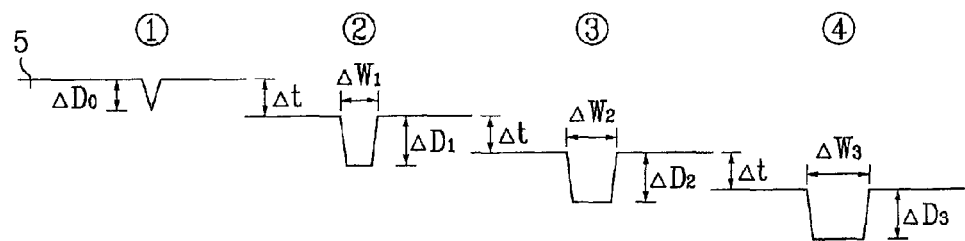
FIG. 4 illustrates a diagram of states of a related art substrate in accordance with time variances in an etching process.
Figure 5:
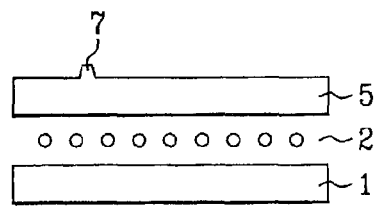
FIG. 5 illustrates a cross-sectional view of a related art liquid crystal display device which is made thin by an etching process.
Figure 6:
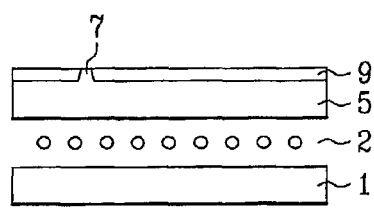
FIG. 6 illustrates a cross-sectional view of a related art thin liquid crystal display device having a flat surface.
Figure 7:
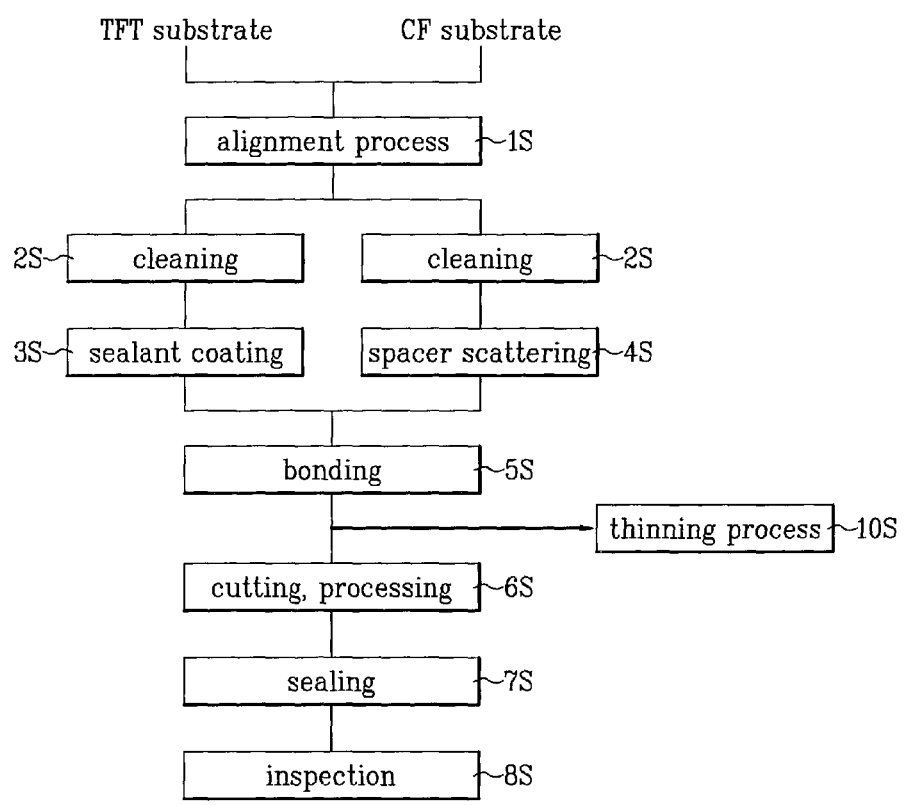
FIG. 7 illustrates a flowchart of a method of fabricating a thin liquid crystal display device according to the present invention.
Figure 8:
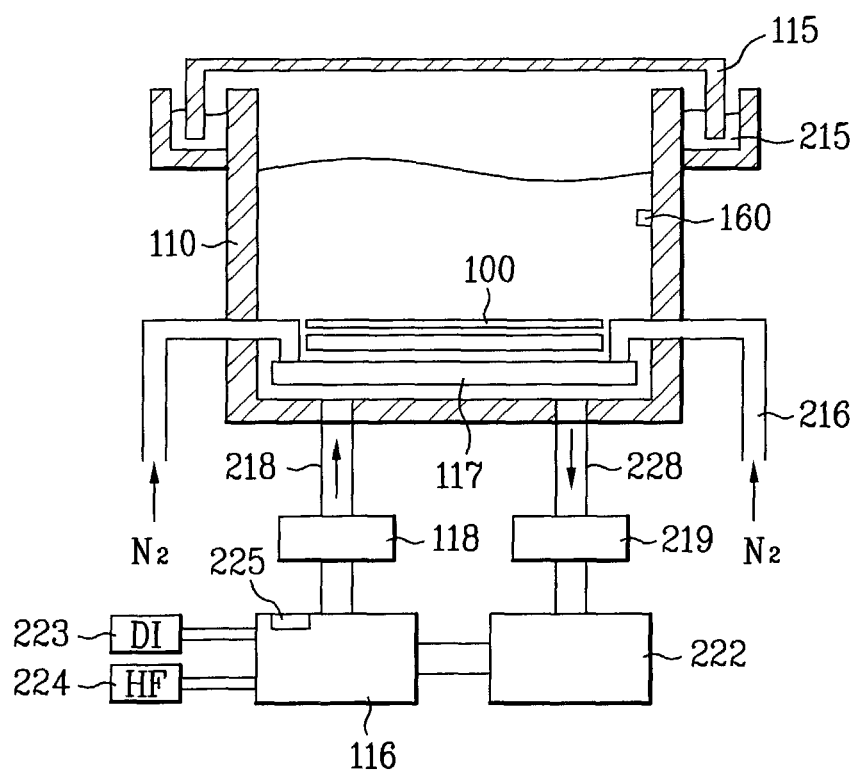
FIG. 8 illustrates a diagram of an etching apparatus according to the present invention.
Figure 9:
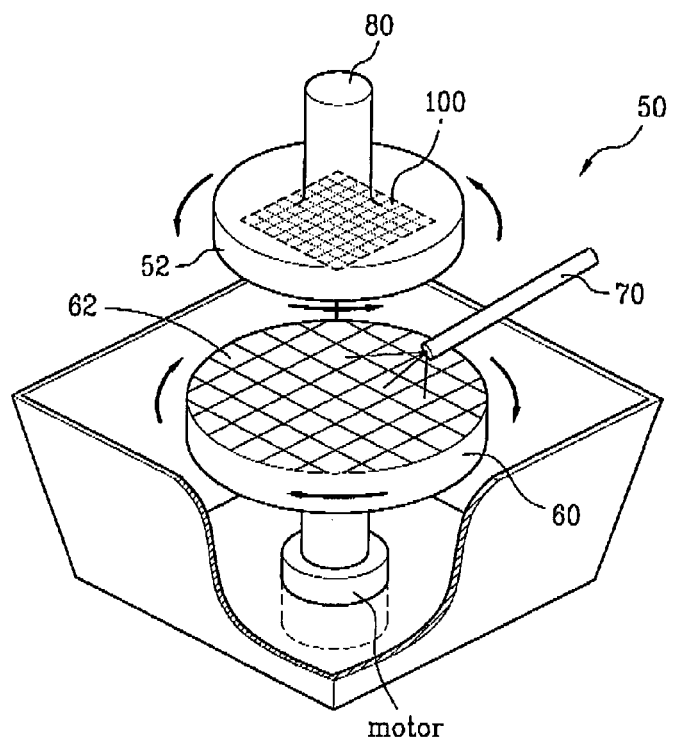
FIG. 9 illustrates a schematic diagram of a grinding apparatus for fabricating a thin liquid crystal display device according to the present invention.
Figure 10:
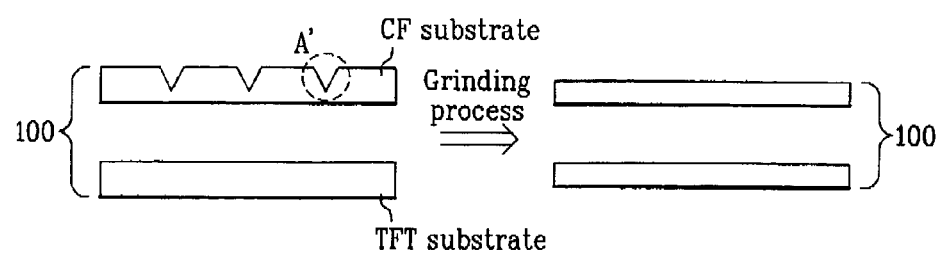
FIG. 10 illustrates a cross-sectional view of a thin liquid crystal display device according to the present invention.

FIG. 7 illustrates a flowchart of a method of fabricating a thin liquid crystal display device according to the present invention. FIG. 8 illustrates a diagram of an etching apparatus according to the present invention. FIG. 9 illustrates a schematic diagram of a grinding apparatus for fabricating a thin liquid crystal display device according to the present invention. FIG. 10 illustrates a cross-sectional view of a thin liquid crystal display device according to the present invention.

First, thin film transistor (TFT) and color filter (CF) substrates, are prepared as shown in FIG. 7.

On the TFT substrate an array process is used to form a plurality of gate lines arranged in one direction so as to leave a predetermined interval from each other, a plurality of data lines arranged in another direction vertical to each of the gate lines so as to leave a predetermined interval from each other, and a plurality of thin film transistors and pixel electrodes formed in pixel areas defined by a plurality of the gate and data lines, respectively.

A black matrix layer for cutting off light from the TFT except the pixel areas, a color filter layer, a common electrode, and the like are formed on the CF substrate.

The TFT and CF substrates are selected, for example, using a robot arm programmed to select one of a plurality of TFT substrates and one of a plurality of CF substrates.

After alignment layers have been formed on the selected TFT and CF substrates, respectively, an alignment process 1S is carried out on the alignment layers so as to provide uniform directions to the liquid crystals.

The alignment process 1S is carried out in the following order: cleaning before forming alignment layer, alignment layer printing, alignment layer curing, alignment layer inspection, and rubbing alignment layer.

After completion of the alignment process 1S, a gap process is carried out.

The gap process includes a cleaning process 2S for cleaning the TFT and CF substrates respectively, a spacer-scattering process 4S for scattering spacers on the CF substrate so as to maintain a cell gap uniformly, a sealant-forming process 3S for forming a sealant on a circumference of the TFT substrate, and a bonding process 5S for bonding the TFT and CF substrates to each other.

Thereafter, a process 10S for thinning a liquid crystal display panel prepared by the bonding process 5S is carried out.

This process is carried out for reducing the weight of the liquid crystal display panel provided by bonding the TFT and CF substrates to each other. The process 10S is carried out in a manner that the liquid crystal display panel is transferred to an etching apparatus so that predetermined surface portions of the TFT and CF substrates are etched.

In this case, an etching target is set up using a strong acid such as an HF solution so as to carry out the etching of the process OS. Namely, the etching target of the TFT and CF substrates, which are about 1.4 mm thick overall is set up, and a temperature generated from an exothermic reaction between the HF solution and substrates is controlled, so as to proceed with the process.

During the etching process, the thickness of the substrates are adjusted by measuring temperature variation occurring in the exothermic reaction between the HF solution and substrates. Namely, the temperature variation is measured by a temperature sensor attached to an inside of an etching container, whereby an etching endpoint can be known.

The etching apparatus according to the present invention is shown in FIG. 8.

Referring to FIG. 8, an etching apparatus according to the present invention includes an etching container 110, a cover 115 installed over the etching container 110 so as to be sealed to the etching container 110 through a water sealant 215, a bubble plate 117 installed inside the etching container 110, gas supply pipes 216 installed at the sides of the bubble plate 117 so as to supply $N_2$ or $O_2$ from a gas supply unit (not shown in the drawing), an etchant supply pipe 218 connected to the lower part of the etching container 110 so as to supply an etchant from an etchant mixing unit 116, an etchant discharge pipe 228 discharging the used etchant outside of the container, and a temperature sensor 160 measuring temperature variation inside the etching container 110.

In this case, the etchant discharged through the etchant discharge pipe 228 is filtered by a filter 219. Hence, impurities are removed from the etchant, and then the etchant is kept in a buffer tank 222. The purified etchant solution stored in the buffer tank 222 is applied again to an etchant mixing unit 116 so as to be mixed with deionized (DI) water and HF supplied from DI and HF supply units 223 and 224, respectively. During mixing, a concentration of the mixture solution is measured by a concentration measurement device 225 installed in the etchant mixing unit 116. If the concentration reaches a setup value, the supply of DI water and HF is stopped.

Moreover, a coolant pipe (not shown) is further installed inside the etchant mixing unit 116 so as to maintain a constant temperature of the mixture solution.

An etching process using the etching apparatus is explained briefly as follows.

First, a liquid crystal display panel 100 is loaded on a cassette (not shown in the drawing) of the etching container 110, and then a pump 118 connected to a bottom of the etching container 110 is driven to supply an etchant mixed uniformly from the etchant mixing unit 116.

Once the etchant reaches a predetermined level, an etching process of the liquid crystal panel 100 is initiated. When a temperature inside the etching container increases, the temperature sensor 160 senses the temperature so as to determine whether to end the etching process.

Namely, since the etching process is an exothermic reaction generating heat from the reaction between the etchant and silicon oxide ($SiO_x$) of the substrate of the liquid crystal display panel 100, the temperature sensor 160 senses the generated heat.

Therefore, reaction heat is calculated in accordance with thickness of each of the substrates and the number of substrates constituting the liquid crystal display panel. If the temperature inside the etching container reaches a predetermined level, the etching process is automatically stopped so as to etch the surface of the liquid crystal display panel to a uniform thickness.

The temperature setup is determined by the following formula, whereby the etch process is automatically stopped once a final temperature is attained.

$Tf = Ti + (Kr \cdot N \cdot \Delta t2)/m$, where Tf, Ti, Kr, N, $\Delta t2$, and m are final temperature, initial temperature, reaction constant, number of substrates, thickness to be etched, and mass of the etching container respectively.

Using the above method, the substrate of about 1.4 mm can be etched to a thickness of about 0.3 mm.

Meanwhile, the bubble plate 117 is further included so as to provide bubbles of oxygen or nitrogen gas supplied inside the etching container 110. The bubbled gas enables the removal of reactants, which are generated from the reaction between the etchant and glass substrate, from the surface of the substrate with ease so as to perform the etching process.

Yet, if scratches exist originally on the TFT or CF substrate or as a result of the apparatus used in the process when the liquid crystal display panel 100 is etched as explained above, the etch profile, as explained in the foregoing description, tends to extend in the directions of the depth and width of each of the scratches. Moreover, the particles formed on the surface of the substrate during etching brings about an etching rate difference, or impurities generated from the etching process may form protrusions on the surface of the substrate locally.

The scratches and protrusions formed on the surface of the substrate, as shown in FIG. 9, can be removed by the revolution, of a grinding device 50 to which an abrasive cloth or paper 62 is attached.

The grinding device 50 includes an upper table 52 having a jig to which the liquid crystal display panel 100 will be fixed, a lower table 60 to which the abrasive cloth 62 is attached, and an abrasive sprayer 70 installed between the upper and lower tables 52 and 60.

A process of grinding a surface of the liquid crystal display panel 100 using the grinding device 50 is explained as follows.

First, the liquid crystal display panel 100 is attached thereto through the jig installed at an inner side of the upper table 52. The liquid crystal display panel 100 can be attached to the upper table 52 using a cylinder 80 enabling the panel to move upward and downward.

The cylinder 80 is moved downward so as to make the liquid crystal display panel 100, which is attached to the upper table 52, attach closely to the abrasive cloth 62 provided on the lower table 60. In this case, the abrasive cloth 62 has a pattern of a checkerboard.

Subsequently, once the lower table 60 is revolved in a direction of an arrow in FIG. 9, for example clockwise, by a motor (not shown), the upper table 52 is revolved in a direction opposite to the revolving direction of the lower table 60. In this case, a pressure of about 360 g/cm$^3$ is applied to the liquid crystal display panel 100 and an abrasive material is sprayed on the lower table 62 by the abrasive sprayer 70, whereby the liquid crystal display panel 100 is grinded through a process such as catalysis. In this case, the grinding process is carried out for a process time of about 10~15 minutes and the abrasive material is oxide or diamond powders. The oxide may be aluminum (Al) oxide or cerium oxide.

After the grinding process has been carried out, one face of the liquid crystal display panel 100 is grinded about 10~40 μm, so that the scratches and protrusions formed through the etching process are removed.

Accordingly, even if wide scratches A' and protrusions (not shown in the drawing) are formed on an outer face of the liquid crystal display panel 100 constituted with the TFT and CF substrates, as shown in FIG. 10, the above-explained grinding process planarizes the face of the liquid crystal display panel so as to remove the scratches and protrusions generated from the etching process. Therefore, stains on a screen of the liquid crystal display device according to the related art can be avoided.

Moreover, if some of the scratches remain after the grinding process, the remaining scratches are so small to be negligible in having influence on the screen of the liquid crystal display device.

The grinding device 50 can be revolved entirely, or only the abrasive cloth 62 can be revolved. Besides, the grinding device 50 can be handled manually by a worker or be applicable to automated equipment. It is preferable that the grinding device 50 is applied to the automated equipment for safety aspects and efficiency.

When the grinding device 50 is applied using automated equipment, the scratches are removed in a manner that a substrate is fixed, the grinding device 50 is moved to be aligned with the liquid crystal display panel 100 by a driving unit of the automated equipment, and the grinding device moves upward and downward with a uniform revolution speed.

The liquid crystal display panel 100 after completion of the grinding process is transferred to the cleaning unit. In the cleaning unit, deionized water is scattered evenly on the liquid crystal display panel 100 so as to remove the etchant remaining on the face of the liquid crystal display panel and sludge on edge faces of the substrate. Such a cleaning cycle is carried out about twice in the cleaning unit, and then the liquid crystal display panel is transferred to the drying unit for drying the deionized water.

The cutting and processing processes 6S of the liquid crystal display panel, as shown in FIG. 7, are carried out so as to form unit liquid crystal display panels.

Thereafter, liquid crystals are injected in each of the unit liquid crystal display panels through a corresponding liquid crystal injection inlet, and the liquid crystal injection inlet is sealed (process 7S) so as to form a liquid crystal layer. After the cut faces of the unit liquid crystal display panel have been grinded, an exterior and electrical failure inspection 8S for the unit liquid crystal display panel is carried out so as to fabricate the liquid crystal display device.

In the above-described embodiment of the present invention, the thinning process of the liquid crystal display panel is carried out prior to the cutting process. Instead, the thin liquid crystal display device can be fabricated by etching and grinding a plurality of the unit liquid crystal display panels, on which the cutting process has been carried out, and loaded on a cassette.

Moreover, the fabrication method of the thin liquid crystal display device is explained on the basis of vacuum injection of liquid crystals. Instead, the present invention enables the fabrication of the thin liquid crystal display device using the liquid crystal dropping method of dropping liquid crystals on the TFT or CF substrate and bonding the TFT and CF substrates to each other.

Besides, the liquid crystal layer can be formed after the etching process has been carried out. Instead, the etching process can be carried out after the liquid crystal layer has been formed between the TFT and CF substrates.

The liquid crystal display panel can be fabricated by each of various methods modified in accordance with systems known to those skilled in the art such as twisted nematic (TN) mode, in-plane switching (IPS), ferroelectric liquid crystal (FLC), optically compensated birefringence (OCB), and the like.

Accordingly, the method of fabricating the thin liquid crystal display device according to the present invention has the following advantages or effects.

First, a surface of the liquid crystal display panel is even, whereby stains on a screen are removed.

Second, the scratches and flaws formed on the surface of the liquid crystal display panel are removed by a simple method using the grinding device, whereby yield is improved to reduce a product cost.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a thin liquid crystal display device having a stain-free image, comprising:
   providing a liquid crystal display panel, including at least one surface having scratches of a first depth and first width;
   etching a substrate of the liquid crystal display panel using an etchant to a thickness of about 0.3 mm, wherein the etching increases the depth and width of the scratches to a second depth and second width sufficient to create a stain on the at least one surface, wherein the size of the scratches becomes greater than a dot size such that light passing through the liquid crystal display panel is refracted to an unwanted path so as to generate a transmittance difference, wherein the etching progresses abruptly in directions of the depth and width of the scratches when the liquid crystal display panel is first contacted with the etchant, wherein an etching amount of the surface of the liquid crystal display becomes equal to that of the depth of the scratch portion so that a variation in the depth direction of the scratch becomes 0 when the scratch portion becomes stable, wherein etching forms protrusions on the surface of the liquid crystal display panel locally; and grinding about 1/30 to 4/30 of the surface of the etched liquid crystal display panel using a grinding device, wherein the grinding removes the protrusions formed by etching and the second depth and second width of the scratches, whereby the stain on the at least one surface is removed, and whereby any remaining scratches are so small to be negligible in having influence on a screen of the liquid crystal display;

wherein the grinding device includes an upper table having a jig to which the etched liquid crystal display panel is fixed, a lower table to which abrasive cloth is attached, an abrasive sprayer installed between the upper and lower tables, a cylinder enabling the etched liquid crystal display panel to move upward and downward, and a container containing the lower table, wherein the container includes a bottom portion and four side portions that protrude from four edges of the bottom portion, wherein the lower table is surrounded by the four side portions, wherein the bottom portion is positioned under the lower table, wherein the container has an opening that faces the bottom portion, wherein an upper surface of the lower table is completely exposed to the outside of the container through the opening;

wherein the upper table rotates in a direction opposite to the rotating direction of the lower table, wherein a pressure of 360 g/cm$^3$ is applied to the etched liquid crystal display panel, so as to planarize the etched liquid crystal display panel;

wherein the grinding process is carried out for a process time of 10-15 minutes;

wherein the abrasive cloth has a pattern of a checkerboard;

wherein abrasive material is sprayed on the lower table by the abrasive sprayer;

wherein the abrasive material is aluminum (Al) oxide or diamond powders;

cleaning the liquid crystal display panel with deionized water, after completion of the grinding step.

2. A method of fabricating a thin liquid crystal display device having a stain-free image, comprising:

providing a plurality of unit liquid crystal display panels in the form of a single liquid crystal display panel, including at least one surface having scratches of a first depth and first width;

etching a substrate of the plurality of unit liquid crystal display panels using an etchant to a thickness of about 0.3 mm while in the form of a single liquid crystal display panel, wherein the etching increases the depth and width of the scratches to a second depth and second width sufficient to create a stain on the at least one surface, wherein the size of the scratches becomes greater than a dot size such that light passing through the plurality of unit liquid crystal display panels is refracted to an unwanted path so as to generate a transmittance difference, wherein the etching progresses abruptly in directions of the depth and width of the scratches when the unit liquid crystal display panel is first contacted with the etchant, wherein an etching amount of the surface of the unit liquid crystal display becomes equal to that of the depth of the scratch portion so that a variation in the depth direction of the scratch becomes 0 when the scratch portion becomes stable, wherein etching forms protrusions on the surface of the liquid crystal display panel locally;

grinding about 1/30 to 4/30 of the surface of the etched plurality of unit liquid crystal display panels using a grinding device while in the form of a single liquid crystal display panel, wherein the grinding removes the protrusions formed by etching and the second depth and second width of the scratches, whereby the stain on the at least one surface is removed, and whereby any remaining scratches are so small to be negligible in having influence on a screen of the unit liquid crystal displays;

cleaning the liquid crystal display panel with deionized water, after completion of the grinding step; and cutting the ground single liquid crystal display panel into separated unit liquid crystal display panels;

wherein the grinding device includes an upper table having a jig to which the etched liquid crystal display panel is fixed, a lower table to which abrasive cloth is attached, an abrasive sprayer installed between the upper and lower tables, a cylinder enabling the etched liquid crystal display panel to move upward and downward, and a container containing the lower table, wherein the container includes a bottom portion and four side portions that protrude from the four edges of the bottom portion, wherein the lower table is surrounded by the four side portions, wherein the bottom portion is positioned under the lower table, wherein the container has an opening that faces the bottom portion, wherein an upper surface of the lower table is completely exposed to the outside of the container through the opening;

wherein the upper table rotates in a direction opposite to the rotating direction of the lower table, wherein a pressure of 360 g/cm$^3$ is applied to the etched liquid crystal display panel, so as to planarize the etched liquid crystal display panel;

wherein the grinding process is carried out for a process time of 10-15 minutes;

wherein the abrasive cloth has a pattern of a checkerboard;

wherein abrasive material is sprayed on the lower table by the abrasive sprayer;

wherein the abrasive material is aluminum (Al) oxide or diamond powders.

3. The method of claim 2, further comprising grinding cut faces of each of the separated plurality of liquid crystal display panels.

4. The method of claim 2, further comprising injecting liquid crystals in each of the separated plurality of liquid crystal display panels.

* * * * *